(12) United States Patent
Bachar et al.

(10) Patent No.: US 12,375,565 B2
(45) Date of Patent: *Jul. 29, 2025

(54) SUB-NETWORKS BASED SECURITY METHOD, APPARATUS AND PRODUCT

(71) Applicant: ForeScout Technologies, Inc., San Jose, CA (US)

(72) Inventors: Shmulik Bachar, Herzliya (IL); Yossi Atias, Kfar-Saba (IL)

(73) Assignee: Forescout Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,612

(22) Filed: Sep. 21, 2023

(65) Prior Publication Data

US 2024/0015223 A1 Jan. 11, 2024

Related U.S. Application Data

(63) Continuation of application No. 17/211,643, filed on Mar. 24, 2021, now Pat. No. 11,843,666, which is a continuation of application No. 16/260,453, filed on Jan. 29, 2019, now Pat. No. 10,965,758, which is a
(Continued)

(51) Int. Cl.
H04L 9/40 (2022.01)
H04L 67/10 (2022.01)
H04L 67/12 (2022.01)
H04L 67/303 (2022.01)
H04L 67/50 (2022.01)
H04L 61/5014 (2022.01)

(52) U.S. Cl.
CPC ............ *H04L 67/12* (2013.01); *H04L 63/102* (2013.01); *H04L 67/10* (2013.01); *H04L 67/303* (2013.01); *H04L 67/535* (2022.05); *H04L 61/5014* (2022.05)

(58) Field of Classification Search
CPC ....... H04L 67/12; H04L 63/102; H04L 67/10; H04L 67/303; H04L 67/535; H04L 61/5014
See application file for complete search history.

(56) References Cited

U.S. PATENT DOCUMENTS 6,167,052 A * 12/2000 McNeill ................ H04L 12/467
370/399
6,317,792 B1 * 11/2001 Mundy ................ H04L 12/2856
709/227

(Continued)

Primary Examiner — Trong H Nguyen
(74) Attorney, Agent, or Firm — Womble Bond Dickinson (US) LLP

(57) ABSTRACT

A method, apparatus and product for sub-networks based cyber security. One method includes detecting a device connecting to a local network, wherein the local network is divided into an initial set of subnets, identifying the device by performing a fingerprinting operation on the device, determining an expected usage of the device and updating the initial set of subnets based on the expected usage of the device to generate an updated set of subnets. The method further includes selecting a subnet of the updated set of subnets of the local network to connect the device based on the expected usage of the device, the selected subnet corresponding to the expected usage of the device and connecting the device to the selected subnet in the local network.

20 Claims, 5 Drawing Sheets

Related U.S. Application Data continuation of application No. 14/949,292, filed on Nov. 23, 2015, now Pat. No. 10,237,351.

(56) References Cited

U.S. PATENT DOCUMENTS

| | | |
|---|---|---|
| 6,792,474 B1 * | 9/2004 | Hopprich ............ H04L 63/0442 709/227 |
| 8,086,729 B1 | 12/2011 | Hindawi et al. |
| 2003/0069954 A1 | 4/2003 | Ma et al. |
| 2004/0208151 A1 | 10/2004 | Haverinen et al. |
| 2005/0278784 A1 | 12/2005 | Gupta et al. |
| 2007/0094724 A1 | 4/2007 | Naedele |
| 2010/0107215 A1 * | 4/2010 | Bechtel ............... H04L 63/0209 726/1 |
| 2012/0002627 A1 | 1/2012 | Norlen et al. |
| 2013/0103811 A1 * | 4/2013 | Blaschke ............ H04L 61/5038 709/221 |
| 2013/0117282 A1 | 5/2013 | Mugali, Jr. et al. |
| 2013/0166707 A1 | 6/2013 | Christenson et al. |
| 2014/0126466 A1 | 5/2014 | Hamdi et al. |
| 2014/0244834 A1 | 8/2014 | Guedalia et al. |
| 2015/0071085 A1 | 3/2015 | Tsirinsky-Feigin |
| 2015/0237039 A1 | 8/2015 | Grajek et al. |
| 2015/0341379 A1 | 11/2015 | Lefebvre et al. |
| 2016/0112452 A1 | 4/2016 | Guevin et al. |
| 2016/0173450 A1 | 6/2016 | Mircescu et al. |
| 2016/0197956 A1 | 7/2016 | Martini |
| 2016/0205123 A1 | 7/2016 | Almurayh |
| 2016/0219066 A1 | 7/2016 | Vasseur et al. |
| 2016/0315955 A1 | 10/2016 | Beatty et al. |
| 2016/0381030 A1 * | 12/2016 | Chillappa ............... H04W 4/38 726/11 |
| 2017/0083898 A1 | 3/2017 | Sidhu et al. |
| 2017/0187703 A1 * | 6/2017 | Enrique Salpico ... H04L 63/162 |

\* cited by examiner

SUB-NETWORKS BASED SECURITY METHOD, APPARATUS AND PRODUCT

CROSS-REFERENCE TO RELATED APPLICATION

This application is a continuation of U.S. patent application Ser. No. 17/211,643, filed Mar. 24, 2021, which is a continuation of U.S. patent application Ser. No. 16/260,453, filed Jan. 29, 2019, issued as U.S. Pat. No. 10,965,758 on Mar. 30, 2021, which is a continuation of U.S. patent application Ser. No. 14/949,292, filed Nov. 23, 2015, issued as U.S. Pat. No. 10,237,351 on Mar. 19, 2019, the entire contents of which are hereby incorporated by reference.

TECHNICAL FIELD

The present disclosure relates to network security, in general, and to using a firewall, in particular.

BACKGROUND

A firewall is a network security system that monitors and controls the incoming and outgoing network traffic based on predetermined security rules. The firewall creates a barrier between a protected network of trusted devices and an external network, such as the Internet. Firewalls allow defining security rules for incoming and outgoing network traffic, which are applied uniformly on all devices of the protected network.

Computing devices have become more and more ubiquitous in the last few decades. This trend of increasingly widespread use was boosted in recent years with the advent of mobile platforms, such as Personal Digital Assistants (PDAs), hand-held computers, and computerized mobile phones running a full-fledged operating system. This widespread use is expected to even further increase in view of the anticipated widespread of the Internet of Things (IoT) devices, connected to computerized networks and used for sensing, monitoring, and affecting physical objects. It is expected that almost every appliance in one's house, such as a boiler, an A/C, a refrigerator, a vacuum cleaner, a Television, or the like, may be an IoT device, embedded with electronics, software, sensors and connectivity to enable it to collect and exchange data over the Internet. The IoT may allow objects to be sensed and controlled remotely across existing network infrastructure, creating opportunities for direct integration between the physical world and computer-based systems, and resulting in improved efficiency, accuracy and economic benefit. In IoT, each thing may be uniquely identifiable through its embedded computing system but is able to interoperate within the existing Internet infrastructure.

BRIEF SUMMARY

One exemplary embodiment of the disclosed subject matter is a method performed by a processor, wherein the method comprises: detecting a device connecting to a local network, wherein the local network is divided into subnets; determining a usage profile of the device; automatically selecting a subnet of the local network to connect the device based on the usage profile; and connecting the device to the selected subnet in the local network.

Another exemplary embodiment of the disclosed subject matter is a method performed by a processor for managing a local network, wherein the local network is divided into subnets, wherein the method comprises: monitoring communication traffic of devices in each of the subnets; performing anomaly detection to detect an abnormal communication of a device connected to a subnet; and blocking the abnormal communication of the device; and removing the device from the subnet and connecting the device to a quarantine subnet of the local network, whereby reducing connectivity of the device with other devices connected to the local network.

Yet another exemplary embodiment of the disclosed subject matter is a device having a processor coupled to memory, wherein the device is connectable to a local network that is connected to an external network, wherein the device being configured to perform: detecting being connected to a networking device of the local network, wherein the networking device is a Dynamic Host Configuration Protocol (DHCP) server of the local network; in response to being connected to the network device, becoming the DHCP server of the local network instead of the networking device; creating at least three subnets for the local network, wherein the at least three subnets comprise: a guest subnet, a user device subnet and an Internet of Things (IoT) subnet; adding each device connected to the local network to one of the at least three subnets, wherein guest devices are connected to the guest subnet; wherein non-guest user devices are connected to the user device subnet and IoT devices are connected to the IoT subnet, whereby dividing the local network into three or more sub-networks; and monitoring communication traffic in the local network, wherein said monitoring comprises applying a first set of security rules on the guest subnet, applying a second set of security rules on the user device subnet, and applying a third set of security rules on the IoT subnet, wherein at least part of the first, second and third sets of security rules are related to inter-subnet communication.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 3B shows a flowchart diagram of a method, in accordance with some exemplary embodiments of the disclosed subject matter; and.

DETAILED DESCRIPTION

One technical problem dealt with by the disclosed subject matter is to provide an improved firewall device. In some exemplary embodiments, a firewall which is capable of protecting a variety of devices may be desired. In some exemplary embodiments, IoT devices may generally have reduced processing and memory capability as well as restriction on power consumption, which may spell reduced amount of potential security related activities to be performed on-device. This is as opposed to user devices (e.g., a mobile device, a smartphone, a Personal Digital Assistant (PDA), a laptop, a desktop computer, or the like), which may implement more complicated security actions, may have software firewalls installed thereon, may execute antivirus and antimalware protection activities, or the like. As a result, different protection schemes may be desired to different devices.

One technical solution may be to divide the local network into subnets. Each subnet may be associated with a different sets of devices, such as but not limited to guest subnet, IoT subnet, user device subnet, quarantine subnet, singleton subnet, or the like. In some exemplary embodiments, devices are assigned to subnets based on their functionality. Additionally or alternatively, devices that together perform a function may be assigned to the same subnet. In some exemplary embodiments, different security rules may be applied to different subnets. Additionally or alternatively, intra-subnet communication may be monitored and potentially blocked for potential malicious activity. Additionally or alternatively, a high-risk device may be allowed to connect to a singleton subnet created for the device, excluding the device from communicating with any other device in the network, but permitting the device to communicate with an external network, such as the Internet.

In some exemplary embodiments, creation of subnets may be automatic when needed. Additionally or alternatively, devices may be automatically assigned to subnets and moved from one subnet to the other based on their profile, including their expected and actual behavior.

Figure 1A:
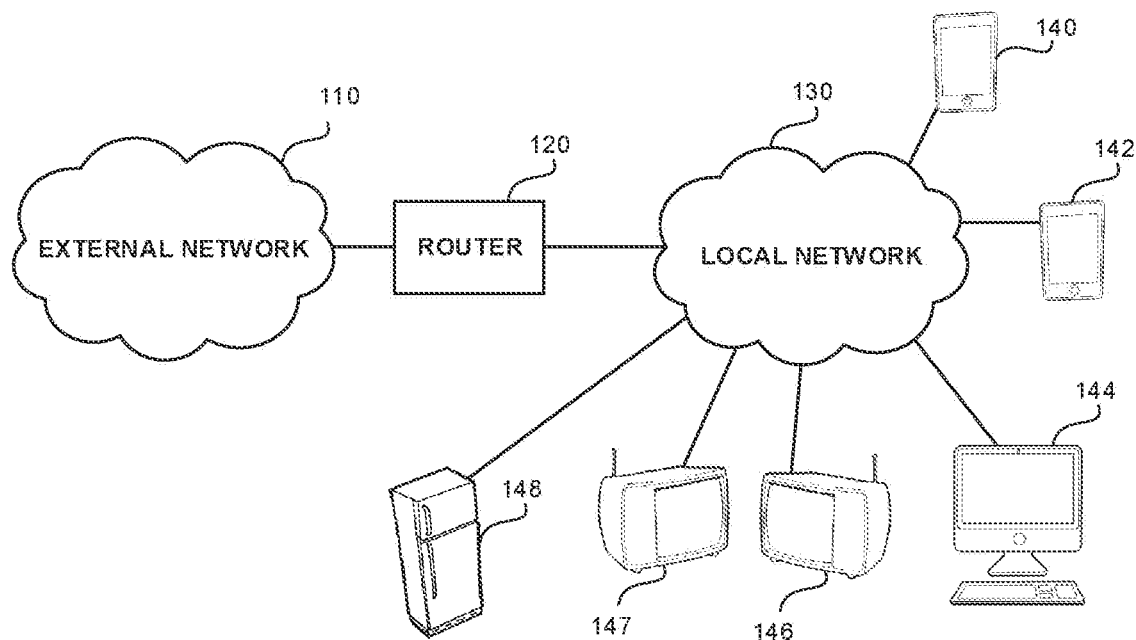
FIGS. 1A and 1B show illustrations of computerized environments, in accordance with some exemplary embodiments of the disclosed subject matter.

Referring now to FIG. 1A showing an illustration of a computerized environment, in accordance with some exemplary embodiments of the disclosed subject matter.

Local Network 130, such as a Local Area Network, a Wi-Fi network, an Ethernet network, intranet, or the like, may be connected to an External Network 110, such as the Internet. In some exemplary embodiments, Router 120 or any other networking device may manage Local Network 130. In some exemplary embodiments, Router 120 may connect Local Network 130 to External Network 110. Additionally or alternatively, Router 120 may function as a Dynamic Host Configuration Protocol (DHCP) server of Local Network 130. Additionally or alternatively, Router 120 may function as a firewall monitoring and potentially blocking incoming or outgoing communication to and from Local Network 130.

In some exemplary embodiments, all devices in the Local Network 130 may be connected to one another, directly or indirectly. For example, all devices may be connected to the router. The connection may be direct or indirect, such as via connectors, via network hubs, or the like.

In some exemplary embodiments, user devices, such as Mobile Device 140, Mobile Device 142 and PC 144 may be connected to Local Network 130. In some exemplary embodiments, the user devices may be devices used by users to provide input to and receive output from the computerized environment. The user devices may function as interactive devices providing a man-machine interface for users. In some exemplary embodiments, some of the user devices may be guest devices which are not routinely connected to the network, such as a device of a client of a business operating Local Network 130, a device of a friend visiting a family operating Local Network 130, or the like. In some exemplary embodiments, a guest device may be any device that is temporarily connected to the network. In some exemplary embodiments, an administrator may manually define which devices are non-guest devices or such a determination may be performed automatically based on connection history of the device to the Local Network 130.

In some exemplary embodiments, IoT devices, such as 146, 147, 148, may be connected to Local Network 130. In some exemplary embodiments, IoT devices 146, 147, 148 may be non-user devices.

In some exemplary embodiments, once a device is connected to Local Network 130, the device may communicate with each other device in the network without having to cross any barriers such as provided by firewalls.

Figure 1B:
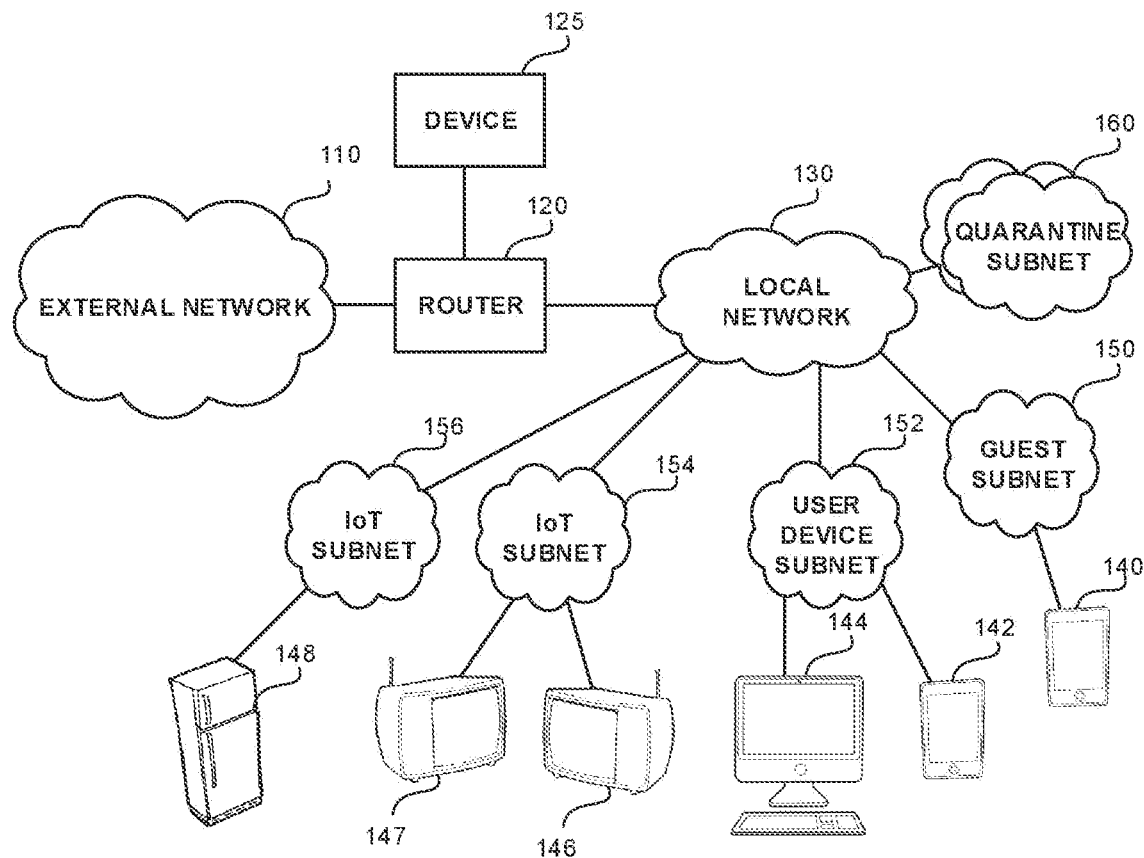

Referring now to FIG. 1B showing an illustration of a computerized environment, in accordance with some exemplary embodiments of the disclosed subject matter.

A Device 125 may be connected to Router 120. Device 125 may be configured to replace Router 120 in managing Local Network 130. In some exemplary embodiments, Device 125 may replace Router 120 as the DHCP server of Local Network 130, as a firewall monitoring and protecting Local Network 130, or the like. However, it will be understood that the disclosed subject matter is not limited to the embodiment depicted in FIG. 1B and may be implemented in other embodiments, such as for example, by implementing functionality of Device 125 into Router 120, by replacing Router 120 by another router which provides functionality of Device 125, or the like.

In some exemplary embodiments, Device 125 may be a dedicated hardware device for providing functionality in accordance with the disclosed subject matter. In some exemplary embodiments, Device 125 may implement an intrusion detection system, such as signature-based intrusion detection. Additionally or alternatively, Device 125 may implement an anomaly detection mechanism which may be based on device profiles.

In some exemplary embodiments, Device 125 may be configured to divide Local Network 130 into a variety of sub-networks (subnets).

In some exemplary embodiments, Guest Subnet 150 may be a subnet for guest devices, such as for example Mobile Device 140.

Additionally or alternatively, User Device Subnet 152 may be a subnet of non-guest user devices, such as Mobile Device 142 and PC 144.

In some exemplary embodiments, IoT subnets may be created. In some exemplary embodiments, all IoT devices may be added to a same IoT subnet. Additionally or alternatively, different IoT subnets may be created for cluster of IoT devices that are expected to communicate with one another, such as for example in case of IoT temperature sensors, IoT air conditioning device and IoT windows (not shown). FIG. 1B exemplifies such an IoT subnet in IoT Subnet 154 which comprises IoT Devices 146, 147. As another example, as IoT Device 148, which may be an IoT of a refrigerator, is not expected to communicate with the IoT Devices in IoT Subnet 154, it may be added to a separate subnet—IoT Subnet 156.

Additionally or alternatively, one or more singleton subnets (not shown) may be defined, each to be used for a single device, such as in case of a potentially malicious device, non-trusted device, or the like.

In some exemplary embodiments, one or more Quarantine Subnets 160 may be defined and used to quarantine devices which are identified as performing malicious or potentially malicious activity. In some exemplary embodiments, Quarantine subnets may be singleton subnets comprising a single device, thereby enabling blocking the quarantined device from all other devices, in accordance with the disclosed subject matter. Additionally or alternatively, a single quarantine subnet may be used to quarantine all devices.

In some exemplary embodiments, Device 125 may provide different security rules for different subnets. As an example, quarantine subnet may be blocked from accessing any resource, including any other device outside the quarantine subnet, or the External Network 110. As another example, a Guest Subnet 150 may be provided with permissive access to External Network 110 via Router 120 and limited access to devices in User Device Subnet 152, while blocking communication with IoT Subnets 154, 156. Additionally or alternatively. Intra-subnet communication may be monitored and firewall rules may be applied to form a barrier selectively blocking intra-subnet, internal communication in Local Network 130.

In some exemplary embodiments, Device 125 may monitor activity of devices to determine in which subnet each device should be. In some exemplary embodiments, upon connecting a new device to Local Network 130, Device 125 may obtain a usage profile of the new device and assign the new device to a subnet according to such usage profile. The usage profile may be an expected usage profile based on the identity of the new device. In some exemplary embodiments, fingerprinting operation may be performed to provide static identifying information about the device thereby revealing expected usage patterns of the device. In some exemplary embodiments, Device 125 may monitor communication after the device is added to the selected subnet, and provide a refined usage profile based on monitored traffic pattern. Accordingly, the new device may be removed from one subnet and added to another.

In some exemplary embodiments, using the disclosed subject matter may reduce potential of Local Network 130 being attacked, as many attack vector would attempt to perform intra-subnet communication. Additionally or alternatively, security rules may be easily applied as different rules may be set to different subnets.

In some exemplary embodiments, security rules enforced by Device 125 may be aware of the internal structure of the network, monitor content of the communication, and be specific for subnets and/or devices. In some exemplary embodiments, the security rules may be based on detection abnormal behavior. Different anomaly detection may be applied for different subnets.

Figure 2A:
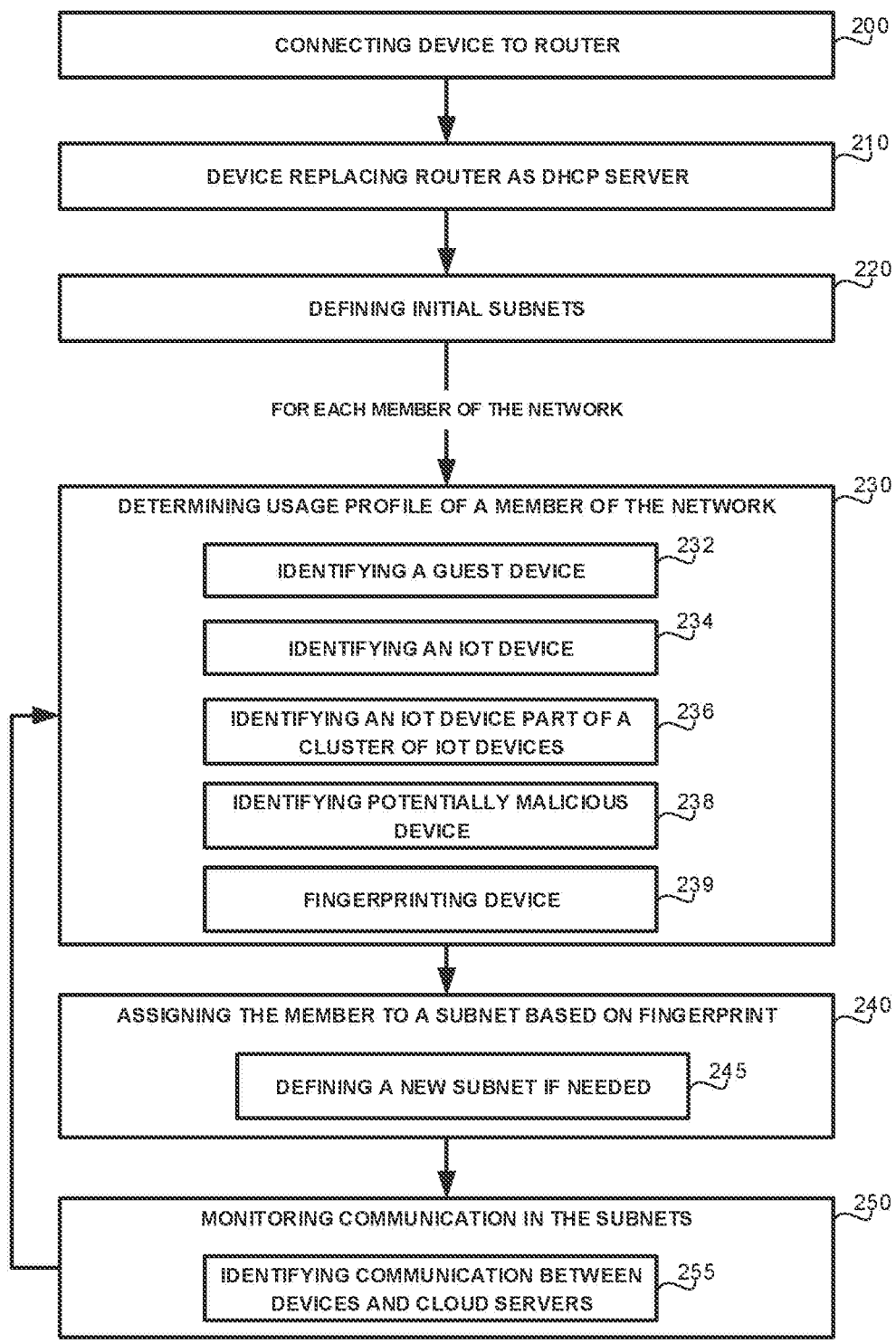
FIG. 2A shows a flowchart diagram of a method, in accordance with some exemplary embodiments of the disclosed subject matter.

Referring now to FIG. 2A showing a flowchart diagram of a method, in accordance with some exemplary embodiments of the disclosed subject matter.

In Step 200, a device, such as 125 of FIG. 1B, may be connected to a router, such as 120 of FIG. 1B. In some exemplary embodiments, the router may be a networking device managing a local network, such as 130 of FIG. 1B.

In Step 210, the device may begin to function as a DHCP server of a local network managed by the router. In some exemplary embodiments, the router may previously be the DHCP server. The device may detect the router being the DHCP server, such as based on the router distributing network configuration parameter (e.g., IP address) to the device. The device may automatically shut down the DHCP functionality of the router, while allowing the router to continue connecting the network to an external network, such as the Internet. In some exemplary embodiments, the router may subsequently function as a network bridge.

In Step 220, initial subnets may be automatically defined. In some exemplary embodiments, the device, which took over as a managing component of the network may define the subnets. In some exemplary embodiments, the initial subnets may include any or all of the following: a user device subnet, a guest subnet, an IoT subnet, a quarantine subnet, or the like. Additionally or alternatively, there may be no initial subnets. Additionally or alternatively, subnets may be created upon demand when they are needed, such as when a singleton subnet is required for a device (e.g., IoT device, user device, or the like), the singleton subnet may be created. As another example, after a cluster of IoT devices is detected, a new subnet may be created for the cluster and the cluster may be moved from their subnet to the newly created subnet.

Steps 230-250 may be performed for each member of the network (e.g., user device, IoT device, or the like). Such steps may be performed for each member that is already existing in the network when the device is connected at Step 200. Additionally or alternatively, new members may be connected after the local network is already managed by the device and may be handled in a similar manner.

In Step 230, a usage profile of the processed member may be determined. The usage profile may be based on various parameters, such as but not limited to a name of the device, a type of the device (e.g., a refrigerator), an operating system of the device, or the like. In some exemplary embodiments, one or more protocols, such as Multicast Domain Name System (MDNS), NetBIOS Name Server (NBNS), Universal Plug and Play (UPnP), or the like. The usage profile may include whether the device is a user device or an IoT device.

Additionally or alternatively, the usage profile may be determined based on cumulative information crowdsourced from other networks having similar devices, which may be used to define an expected usage profile of the device. In some exemplary embodiments, a device is expected to behave like other similar devices in the crowd. As an example, a camera IoT device is expected to behave like other camera IoT devices (even of different type or make).

In some exemplary embodiments, a guest device may be identified (Step 232). The guest device may be identified as a device not previously connected to the network, not connected to the network sufficient amount of times or for a sufficient connection period, not defined by the administrator as non-guest device, or the like.

In some exemplary embodiments, an IoT device may be identified (Step 234). The IoT device may be identified based on the name of the device, its operating system, declared or actual protocols, or the like. In some exemplary embodiments, the IoT device may be identified based on monitored communication (in Step 250), such as by identifying with which cloud server the device communicates (Step 255).

In some exemplary embodiments, an IoT device that is part of a cluster may be identified (Step 236). The cluster may be identified based on prior information that certain IoT devices communicate with one another (such as information crowdsourced from other networks), based on vendor identity (e.g., GM™ devices may be assumed to connect to one another), based on type of device (e.g., air conditioner may connect to windows, but not to security sensors), or the like. In some exemplary embodiments, the cluster may be identified based on monitored communication (in Step 250), such as by identifying traffic patterns between the IoT devices.

In some exemplary embodiments, a potentially malicious device may be identified (Step 238). The potentially malicious device may be identified upon connection, such as based on its signature, its attempting to appear as a different device, its connection time (e.g., connecting when no one is at home or in the office, as may be determined by security sensors or based on an electronic calendar; connecting in the middle of the night; or the like), or the like. Additionally or alternatively, the potentially malicious device may be identified based on monitored communication (in Step 250), such as by identifying traffic patterns consistent with an attack.

In some exemplary embodiments, device fingerprinting may be performed (Step 239). Fingerprints can be used to fully or partially identify individual devices. During fingerprinting a fingerprint of a device may be obtained. The fingerprint value may be stable for the same device and may be diverse so that different devices (or devices of different types) may have a different value. Fingerprinting may be passive based on information received from the device. In some exemplary embodiments, passive fingerprinting may be performed based on information provided as part of a communication protocol (E.g., IEEE 802.11 (wireless setting), TCP/IP configuration, OS fingerprint, or the like). Active fingerprinting may be performed by querying the device for information such as a Media Access Control (MAC) address, vendor, or the like.

In Step 240, a subnet suitable for the member analyzed may be selected based on the usage profile. The member may be added to the selected subnet. In some exemplary embodiments, the subnet may not a-priori exist, such as in case of a first IoT device connected to the network, a required singleton user device subnet for an un-trusted device, or the like. In such a case, the new subnet may be defined automatically (Step 245).

In Step 250, communication in the network is monitored. In some exemplary embodiments, the communication in the subnets is monitored, so as to identify intra-subnet and inter-subnet communication. In some exemplary embodiments, traffic pattern may be useful for determining usage profile of a device. Additionally or alternatively, after an initial coarse usage profile is determined in Step 230, a refined usage profile may be determined in view of the monitored traffic. Additionally or alternatively, actual traffic pattern may be compared to expected traffic pattern, such as for detecting anomalies which may indicate a potential malicious activity. In some exemplary embodiments, communication between devices in the network and cloud servers may be identified (Step 255) and utilized for refining the usage profile and detecting abnormal behavior. As an example, in the beginning, a device may be identified as an IoT device associated with a refrigerator based on its name and Operating system (e.g., based on its fingerprint). There may be multiple devices with the same signature such as in view of not including a specific brand or additional identifiers of the device. During monitoring, the device may be monitored as accessing a particular cloud server, such as for example a cloud server of a particular manufacture, indicating the device is provided by the manufacture. Furthermore, the content of packages sent by the device may be useful to recognize a specific make of the device. Based on the added information, a refined usage profile may be determined which is more precise and takes into account additional information which were not taken into account in defining the coarse usage profile upon initial analysis of the device.

In some exemplary embodiments, after a refined usage profile is determined in Step 230, the device may be moved to a different subnet than originally assigned to (in Step 240).

Figure 2B:
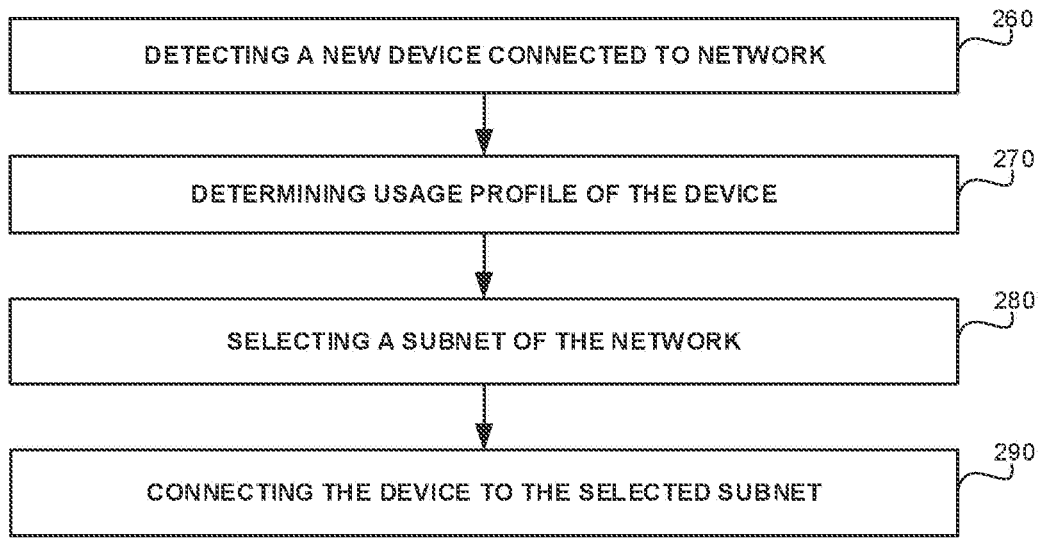
FIG. 2B shows a flowchart diagram of a method, in accordance with some exemplary embodiments of the disclosed subject matter.

FIG. 2B shows a flowchart diagram of a method, in accordance with some exemplary embodiments of the disclosed subject matter, in which a new device is connected to a network that is a priori managed in accordance with the disclosed subject matter. In Step 260, a new device is detected as connecting to the network. The network may be a-priori managed by a device, such as 125 of FIG. 1B. In Step 270, a usage profile of the device may be determined. The determination may be similar to that performed in Step 230 of FIG. 2A. Based on the usage profile, a subnet may be selected for the device (Step 280) and the device may be connected to the selected subnet (Step 290).

Figure 3A:
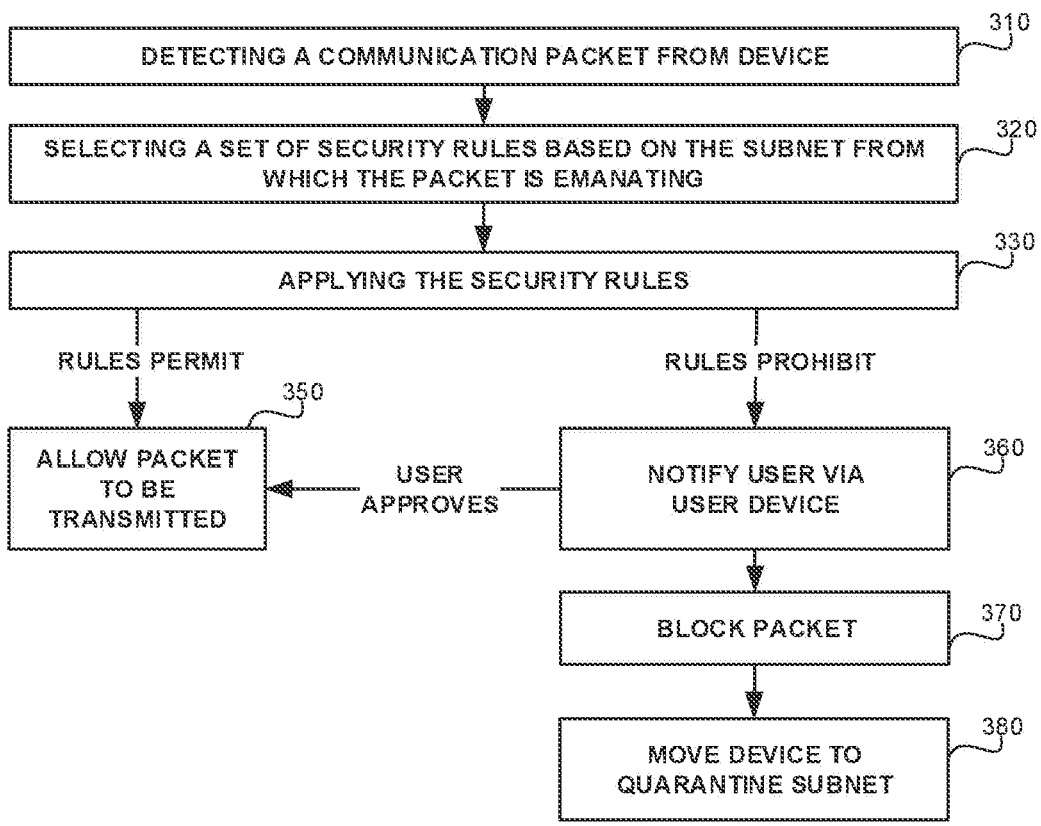
FIG. 3A shows a flowchart diagram of a method, in accordance with some exemplary embodiments of the disclosed subject matter.

Referring now to FIG. 3A showing a flowchart diagram of a method, in accordance with some exemplary embodiments of the disclosed subject matter.

In Step 310, a packet transmitted by a device in the network may be detected. The packet may be detected by a networking device which may or may not manage the local network. In some exemplary embodiments, all packets that are passed through the network may be visible to the networking device. In some embodiments, the content of the packet may be encrypted, such as in case of HTTPS communication. In such a case, the meta-data information in the header may be visible to the networking device, while the body of the packet (e.g., data itself) may not be. For the ease of explanation and without limiting the scope of the disclosed subject matter, below the disclosed subject matter refers to transmitted packets. However, it will be explicitly noted that a corresponding method may be applied with respect to a packet that is sent towards a device.

In Step 320, one or more security rules may be selected. The security rules may be firewall rules for blocking packets, for acting upon packets having some data or meta-data, or the like. In some cases, a rule may prohibit certain or all intra-subnet communication, inter-subnet communication, communication towards another device or sets of devices, communication towards an external network, such as the Internet, or the like. The security rules may be selected as a set of security rules applicable to the subnet to which the device is connected. In some embodiments, one set of rules may be applicable, for example, for guest subnet such as 150 of FIG. 1B, while another set of rules may be applicable, for example, for user device subnet such as 152 of FIG. 1B. Additionally or alternatively, there may be specific rules for the device itself, such as expecting an IoT device to communicate only with a remote server at a certain domain, expecting IoT device to send packets of specific content, or the like. The selected set of security rules may be applied (Step 330) on the packet.

In case the rules permit the packet, e.g. the device is allowed to send the data towards the destination, then the packet may be allowed to be transmitted (Step 350).

In case the rules prohibit the packet, the packet may be blocked and not allowed to be transmitted (Step 370). In some cases, a user may be notified via a user device (Step 360) and may be allowed to approve the communication. As an example, the user may be an administrator using a user device, such as a mobile phone. The user may be notified via the mobile phone of the temporarily blocked packet and its originating source (e.g., IoT device of a refrigerator). The user may be aware of abnormal behavior, such as is in view of her specific rare action. As a result, the user may then approve the action and the packet may be allowed to be transmitted (Step 350). In some cases, the user may be notified via a user device that is connected to a user device subnet, which is different than the device that transmitted the packet and the device towards which the packet was transmitted. In some embodiments, the user may only be notified if the user device is connected to the network. In case the user device is not connected, the packet may be blocked without soliciting user's approval.

In Step 380, after one or more packets transmitted by the device were blocked, the device may be moved from its subnet to a quarantine subnet (which may or may not be a singleton subnet). In some cases, the device may be put to quarantine and have more restrictive security rules applied thereon, such as but not limited to complete blockage of all incoming and outgoing communication. In some exemplary embodiments, a device which is deemed a potential malicious device in view of its monitored activity, may be moved to the quarantine subnet.

Figure 3B:
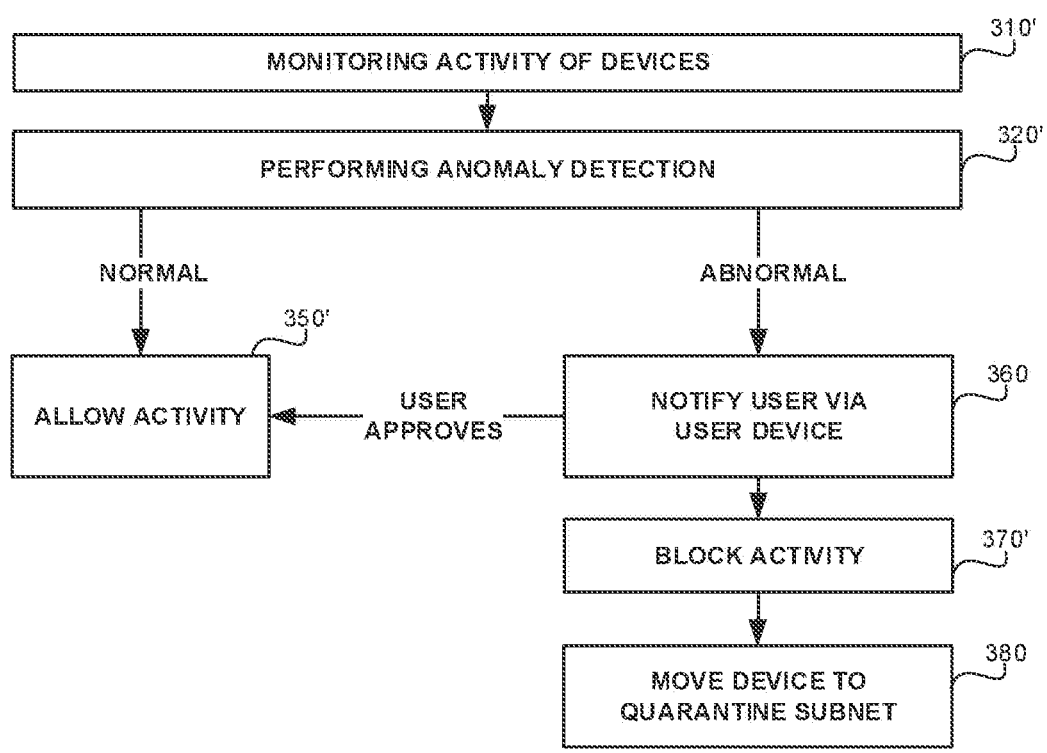

Referring now to FIG. 3B showing a flowchart diagram of a method, in accordance with some exemplary embodiments of the disclosed subject matter. The method of FIG. 3B is similar to that of FIG. 3A. In the method of FIG. 3B, device activity, such transmitting or receiving a packet, is detected (310') and monitored for abnormal behavior using anomaly detection (320'). It will be noted that security rules, such as selected in Step 320 of FIG. 3A, may be based on perform anomaly detection as well.

As an example, a garage opener device may be an IoT device that is not expected to send video content. In case video data is sent by such a device, this may be indicative of a problem. In some exemplary embodiments, based on the knowledge of what a device is, expectations may be provided based on rules and on the behavior of other similar devices elsewhere (e.g., crowd-sourced information). In some exemplary embodiments, IoT devices may have relatively a short range of applicable behavior. By monitoring traffic of the IoT device and using crowd-sourced data of additional similar IoT devices (same IoT device, similar type of IoT device, etc.), expected traffic patterns may be determined. The crowd-sourced data may be data of devices that are not connected to the same local network, such as monitored in other networks. Communication packets emitted by or transmitted to IoT devices may be compared with expected traffic pattern. If the communication packet is inconsistent with the expected traffic pattern, it may be considered anomalous, it may be detected and potentially blocked. In some exemplary embodiments, the traffic pattern may define a precise format of the packet, such as potential target device (e.g., cloud server in a specific domain), data content having value from a specific domain (e.g., information from a predetermined number of sensors, each having a range of potential values), consistent data fields (e.g., IoT device identifier), timing restrictions (e.g., between 2-10 packets per minute), or the like. It will be noted that as opposed to user devices, IoT devices may have a relatively more rigid and consistent traffic pattern that is not user-dependent. As such, crowd-sourced information may be useful for precisely predicting expected traffic patterns of the IoT device.

In the method of FIG. 3B, normal activity is allowed to be performed (350'), while abnormal activity is identified. The user may be notified thereof (360) to allow her to manually approve the activity. In case the abnormal activity is not allowed, it may be blocked (370'). In some cases, based on such blocked activities the device may be moved to quarantine subnet (380).

Figure 4:
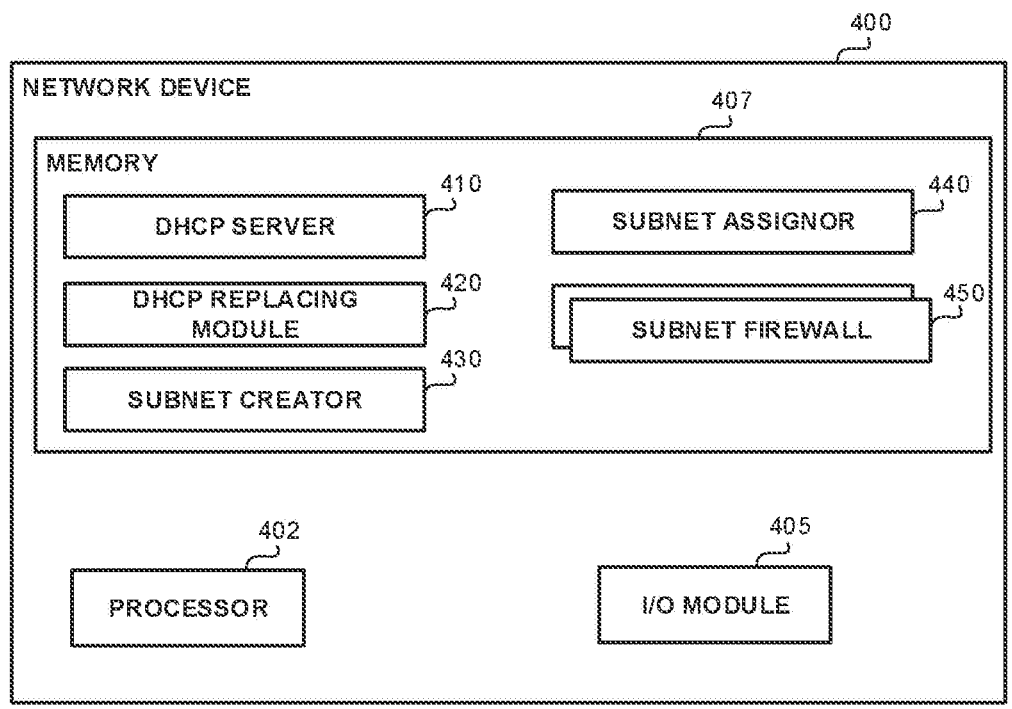
FIG. 4 shows a blog diagram of a network device, in accordance with some exemplary embodiments of the disclosed subject matter.

Referring now to FIG. 4 showing a network device, in accordance with some exemplary embodiments of the disclosed subject matter.

A Network Device 400, such as device 125 of FIG. 1B, may be configured to manage, monitor, protect or perform similar actions with regards to a local area network. Network Device 400 may be configured to perform any of the methods depicted in FIGS. 2A, 2B, 3A, 3B.

In some exemplary embodiments, Network Device 400 may comprise a Processor 402. Processor 402 may be a Central Processing Unit (CPU), a microprocessor, an electronic circuit, an Integrated Circuit (IC) or the like. Processor 402 may be utilized to perform computations required by Network Device 400 or any of it subcomponents.

In some exemplary embodiments of the disclosed subject matter, Network Device 400 may comprise an Input/Output (I/O) Module 405. I/O Module 405 may be utilized to provide an output to and receive input from a user (not shown). I/O Module 405 may be used to provide an interface to a router, such as 120 of FIG. 1A, for example a wired or wireless connection to the router. Additionally or alternatively, I/O Module 405 may be configured to allow one or more devices to connect to Network Device 400 to allow it to define a local network and connect different devices to one another.

In some exemplary embodiments, Network Device 400 may comprise a Memory 407. Memory 407 may be a hard disk drive, a Flash disk, a Random Access Memory (RAM), a memory chip, or the like. In some exemplary embodiments, Memory 407 may retain program code operative to cause Processor 402 to perform acts associated with any of the subcomponents of Network Device 400.

In some exemplary embodiments, DHCP Server 410 may be configured to dynamically distribute network configuration parameters, such as IP addresses, to devices in the network. DHCP Server 410 may be configured to define for each device an IP address which may include a subnet portion defining a subnet to which the device is connected and a host part defining an identifier of the device within the subnet. The DHCP Server 410 may be configured to create new subnets, assign devices to subnets, move devices from one subnet to the other, or the like.

In some exemplary embodiments, DHCP Replacing Module 420 may be configured to detect an existing DHCP server managing a network to which Network Device 400 is connected (e.g., router 120 of FIG. 1A), and take its place as the DHCP server. In some exemplary embodiments, DHCP Replacing Module 420 may be configured to shut down the existing DHCP server and invoke DHCP Server 410 to begin managing the network.

In some exemplary embodiments, Subnet Creator 430 may be configured to create subnets in accordance with the disclosed subject matter. In some exemplary embodiments, Subnet Creator 430 may create subnets upon demand, such as when a device is required to be added to such subnet. Additionally or alternatively, Subnet Creator 430 may create initial subnets, such as an initial IoT subnet, a guest subnet, and a user device subnet, or the like. In some exemplary embodiments, Subnet Creator 430 may maintain a list of existing subnets thereby avoiding creating subnets having the same desired functionality (e.g., two guest subnets).

In some exemplary embodiments, Subnet Assignor 440 may be configured to determine an appropriate subnet for a device. Subnet Assignor 440 may take into account fingerprinting information of the device, expected profile, actual profile, or the like. In some exemplary embodiments, Subnet Assignor 440 may determine the subnet for a device and invoke DHCP Server 410 to implement the assignment of the device to a desired subnet. Additionally or alternatively, Subnet Assignor 440 may invoke Subnet Creator 430 to create the desired subnet, if such subnet was not previously created.

In some exemplary embodiments, Subnet Firewall 450 may be configured to apply subnet-specific security rules. Each subnet may have a different subnet firewall that monitors and potentially protects it.

In some exemplary embodiments, the disclosed subject matter may provide for access control—defining who can connect and who cannot to any of the device (e.g., the user, the vendor, others). In some exemplary embodiments, a per-device policy may be defined and managed by the user. As an example, only the user may connect to the refrigerator, no one from the outside can connect to the door sensor (only the security manager device on its network can connect to), or the like.

In some exemplary embodiments, the disclosed subject matter may limit the places the device can speak to, for example to the provider of the device. As an example, a GM™, IoT device may only be allowed to connect to the GM™ cloud service, thereby preventing any potential attack on the IoT device to allow a malicious user to gain access to information of the IoT device.

In some exemplary embodiments, the disclosed subject matter may find anomaly and either block the anomaly or not. As an example, in case the device untypically transmits a package designated towards China. The disclosed subject matter may discover that the device is performing an unforeseen activity (either based on its past activities, based on a benchmark of similar devices, or the like). In such a scenario, the activity may be blocked or the user may be warned to allow her to decide whether or not to block the activity.

In some exemplary embodiments, different devices may have different protection capabilities. As an example, a mobile computing user device may have installed thereon an anti virus or anti malware software to protect it, while an IoT device may be incapable of doing so (e.g., no such software exists for the OS; impractical as would require significant processing time, bandwidth, power consumption, or the like). In some exemplary embodiments, devices that are incapable of protecting themselves may be added to a subnet which may be protected by an additional protection layer than a subnet of devices which can protect themselves.

In some exemplary embodiments, potential attacks may be identified and protected against. In some exemplary embodiments, The IoT device cannot have such defenses as it may not be capable of executing required algorithm. A network device, such as 400 of FIG. 4, may provide the defense without the IoT devices being capable of protecting themselves from the attack. For example, if someone figured out an attack on a sensor, the device may not let it happen by not letting a connection to the sensor be established in specific ways that are part of the attack vector.

In some exemplary embodiments, the network device may also protect other network devices, such as the router (e.g. 120 of FIG. 1A). In many cases, routers may be vulnerable to attacks, such as due to users using default certifications, failing to upgrade firmware, or the like. As the network device may take the place of the router, it may protect against potential attacks on the vulnerable router. Additionally or alternatively, the network device may be configured to update automatically so as to avoid such vulnerabilities. In some exemplary embodiments, even if the router is attacked, the network remains protected as the network device is managing the network and not the router.

In some exemplary embodiments, guest in the house are on separate subnet and may not see the devices connected to the network, the devices invisible so people can't find who they are. In many attack vector, the beginning of the attack is by joining the network (someone physically near the house) or by attacking the router, so as to discover the devices in the home network. By separating the guests and blocking them from detecting other devices on other subnets, many attack vectors may be ineffective.

In some exemplary embodiments, upon repeated attempts to access a device, such as brute force password getting attacks on a camera IoT device, may be detected. The device may be moved to a different subnet and may become more protected.

In some exemplary embodiments, devices may only be allowed to communicate with devices with whom they should communicate (e.g., devices of a same cluster, user devices controlling IoT devices, or the like). By blocking communication possibilities between devices in the network, may attack vectors may become ineffective.

In some exemplary embodiments, a Denial of Service (DoS) attack on home devices may be detected. As an example, an IP Camera may have its IP known. While the IP Camera may not be able to protect itself from DoS attacks, the disclosed subject matter may be utilized to protect the IP Camera by the external device—the network device.

In some exemplary embodiments, each IoT device may have a usage profile. In some exemplary embodiments, IoT devices may be generally single purpose so their profile of behavior—e.g. who it talks to, how etc.,—may be relatively simple and unique. Based on simplified usage profiles, anomalies may be relatively easy to identify. In some exemplary embodiments, crowd sourcing may be used to create profile of behavior. The IoT device may be expected to behave like other in the crowd of similar devices (cameras) or the same devices (a camera by the same vendor and of the same make). In some exemplary embodiments, statistics on behavior of devices may be sent to a cloud server which may analyze it for anomalies.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   detecting a device connecting to a local network, wherein the local network is divided into an initial set of subnets;
   identifying the device by performing a fingerprinting operation on the device;
   determining an expected usage of the device based on the fingerprinting operation;
   updating the initial set of subnets based on the expected usage of the device to generate an updated set of subnets;

selecting a subnet of the updated set of subnets of the local network to connect the device based on the expected usage of the device, the selected subnet corresponding to the expected usage of the device; and connecting the device to the selected subnet in the local network, wherein the selecting of the subnet is based on crowd-sourced data from devices in a network other than the local network.

2. The method of claim 1, wherein the initial set of subnets comprise a guest subnet and at least one non-guest subnet, wherein guest devices are connected temporarily to the guest subnet, wherein non-guest devices are connected to the non-guest subnet, wherein the guest and non-guest devices are automatically separated, wherein the device is a non-guest device, and wherein the selecting the subnet of the updated set of subnets comprises selecting the subnet from the at least one non-guest subnet.

3. The method of claim 2, wherein the guest devices in the guest subnet are blocked from accessing other subnets of the local network and are allowed to access an external network to block potential malicious activity by the guest devices.

4. The method of claim 1, wherein the initial set of subnets comprise an Internet of Things (IoT) subnet, wherein the IoT subnet is a subnet to which only IoT devices are connected, wherein the device is an IoT device, wherein the method further comprises determining a usage profile of the device that is consistent with the device being the IoT device, and wherein the selecting the subnet comprises selecting the IoT subnet for the IoT device.

5. The method of claim 1, wherein the initial set of subnets comprise two or more Internet of Things (IoT) subnets, wherein each of the two or more IoT subnets is a subnet to which only IoT devices are connected, wherein the selecting of the subnet comprises selecting one of the two or more IoT subnets for an IoT device, and wherein the selected IoT subnet is selected based on the IoT device being expected to communicate with other IoT devices in the selected IoT subnet and based on the IoT device being restricted from communicating with IoT devices in other subnets of the two or more IoT subnets.

6. The method of claim 1, further comprising monitoring network activity in each of the initial set of subnets of the local network, wherein the monitoring of the network activity comprises applying different security rules to each of the initial set of subnets.

7. The method of claim 1, further comprising:
detecting an expected functionality of the device based on the fingerprinting operation.

8. The method of claim 1, wherein the determining of the expected usage comprises identifying a cloud server with which the device communicates, and wherein the cloud server is in a network external to the local network.

9. The method of claim 1,
wherein the determining of the expected usage of the device comprises:
determining a fingerprint of the device; and
obtaining an expected usage profile based on crowd-sourced data that corresponds to devices having similar fingerprints to the fingerprint of the device.

10. The method of claim 4, wherein the determining of the usage profile of the device is performed in response to the device being connected to the local network, wherein the determining of the expected usage of the device comprises determining a first usage profile based on a fingerprint of the device, and wherein the method further comprises:

monitoring traffic pattern of the device when the device is connected to the selected subnet;
determining a second usage profile based on the traffic pattern of the device; and
in response to the determining of the second usage profile, removing the device from the selected subnet and connecting the device to a second selected subnet.

11. The method of claim 1, wherein the determining of the expected usage of the device comprises:
determining a type of the device, wherein the type is a class of an electric device the device implements, wherein the expected usage is based on the type of the device, and wherein the selecting of the subnet is based on the type of the device.

12. A computer program product comprising a non-transitory computer readable storage medium storing program instructions, which, when read by a hardware processor, cause the hardware processor to:
detect a device connecting to a local network, wherein the local network is divided into an initial set of subnets;
identify the device by performing a fingerprinting operation on the device;
determine an expected usage of the device based on the fingerprinting operation;
update the initial set of subnets based on the expected usage of the device to generate an updated set of subnets;
select a subnet of the updated set of subnets of the local network to connect the device based on the expected usage of the device, the selected subnet corresponding to the expected usage of the device; and
connect the device to the selected subnet in the local network,
wherein the selecting of the subnet is based on crowd-sourced data from devices in a network other than the local network.

13. The computer program product of claim 12, wherein the initial set of subnets comprise a guest subnet and a non-guest subnet, wherein guest devices are connected temporarily to the guest subnet, wherein non-guest devices are connected to the non-guest subnet, wherein the guest and non-guest devices are automatically separated, and wherein the guest devices in the guest subnet are blocked from accessing other subnets of the local network and are allowed to access an external network to block potential malicious activity by the guest devices.

14. The computer program product of claim 12, wherein the initial set of subnets comprise an Internet of Things (IoT) subnet, wherein the IoT subnet is a subnet to which only IoT devices are connected, and wherein the selecting of the subnet comprises selecting the IoT subnet for an IoT device.

15. The computer program product of claim 12, wherein the initial set of subnets comprise two or more Internet of Things (IoT) subnets, wherein each of the two or more IoT subnets is a subnet to which only IoT devices are connected, wherein, to select the subnet, the instructions cause the hardware processor to select one of the two or more IoT subnets for an IoT device, and wherein the selected IoT subnet is selected based on the IoT device being expected to communicate with other IoT devices in the selected IoT subnet.

16. An apparatus, comprising:
a memory; and
a hardware processor operatively coupled with and the memory, wherein the hardware processor is configured to:

detect a device connecting to a local network, wherein the local network is divided into an initial set of subnets;

identify the device by performing a fingerprinting operation on the device;

determine an expected usage of the device based on the fingerprinting operation;

update the initial set of subnets based on the expected usage of the device to generate an updated set of subnets;

select a subnet of the updated set of subnets of the local network to connect the device based on the expected usage of the device, the selected subnet corresponding to the expected usage of the device; and connect the device to the selected subnet in the local network, wherein the selecting of the subnet is based on crowd-sourced data from devices in a network other than the local network.

17. The apparatus of claim 16, wherein the initial set of subnets comprise a guest subnet and a non-guest subnet, wherein guest devices are connected temporarily to the guest subnet, wherein non-guest devices are connected to the non-guest subnet, wherein the guest and non-guest devices are automatically separated, and wherein the guest devices in the guest subnet are blocked from accessing other subnets of the local network and are allowed to access an external network to block potential malicious activity by the guest devices.

18. The apparatus of claim 16, wherein the initial set of subnets comprise an Internet of Things (IoT) subnet, wherein the IoT subnet is a subnet to which only IoT devices are connected, and wherein, to select the subnet, the hardware processor is to select the IoT subnet for an IoT device.

19. The apparatus of claim 16, wherein the initial set of subnets comprise two or more Internet of Things (IoT) subnets, wherein each of the two or more IoT subnets is a subnet to which only IoT devices are connected, wherein, to select the subnet, the hardware processor is to select one of the two or more IoT subnets for an IoT device, and wherein the selected IoT subnet is selected based on the IoT device being expected to communicate with other IoT devices in the selected IoT subnet.

20. The apparatus of claim 16, wherein the determining of the expected usage of the device comprises:

determining a type of the device, wherein the type is a class of an electric device the device implements, wherein the expected usage is based on the type of the device, wherein the selecting of the subnet is based on the type of the device.

* * * * *